Oct. 22, 1968          S. L. WILLIAMS          3,406,791
FLUID PRESSURE OPERATED BRAKE APPARATUS FOR RAILWAY CAR TRUCK
Filed Jan. 31, 1967                                  2 Sheets-Sheet 2
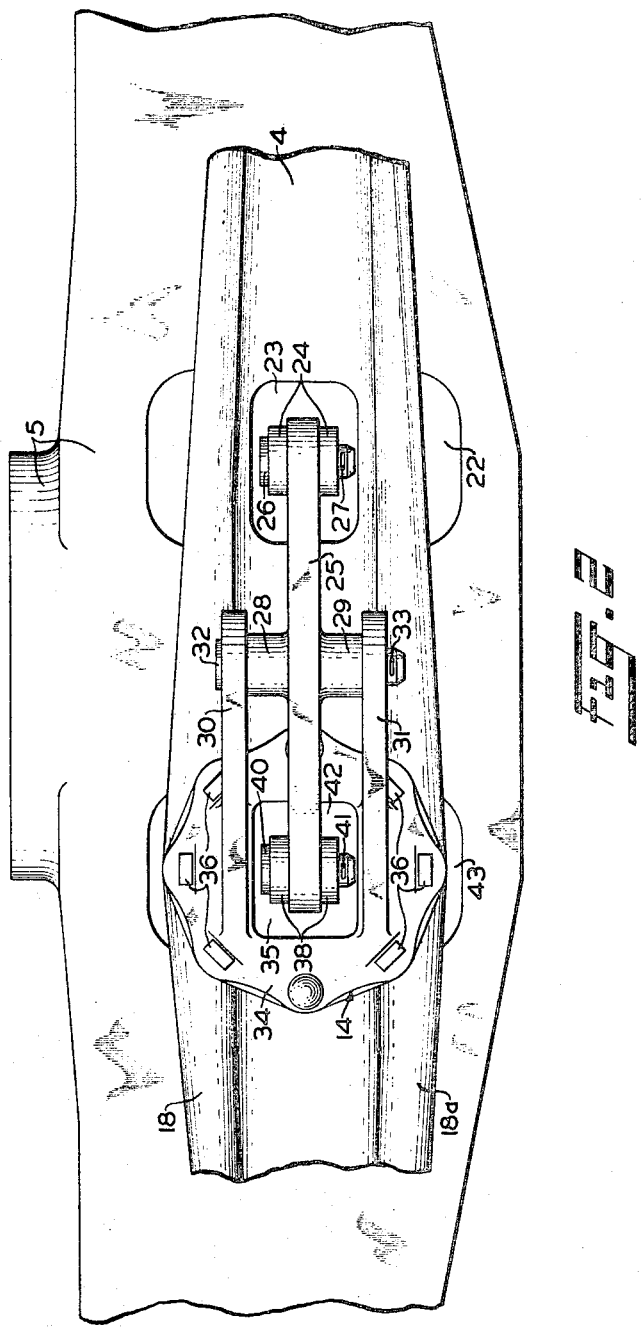
INVENTOR.
SAMUEL L. WILLIAMS
BY
ATTORNEY

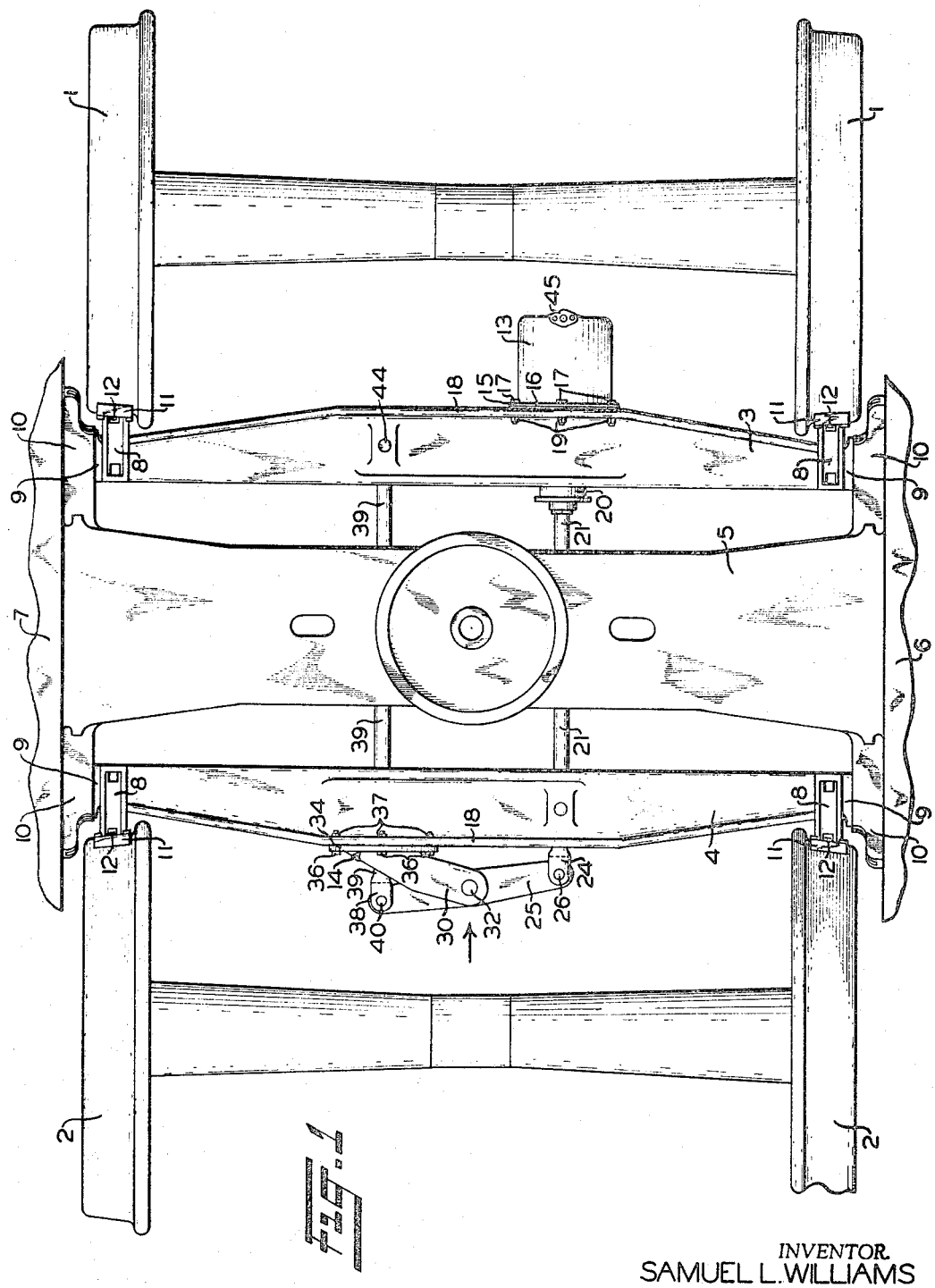

United States Patent Office 3,406,791
Patented Oct. 22, 1968

3,406,791
FLUID PRESSURE OPERATED BRAKE APPARATUS FOR RAILWAY CAR TRUCK
Samuel L. Williams, Pittsburgh, Pa., assignor to Westinghouse Air Brake Company, Wilmerding, Pa., a corporation of Pennsylvania
Filed Jan. 31, 1967, Ser. No. 613,018
5 Claims. (Cl. 188—52)

ABSTRACT OF THE DISCLOSURE

A brake rigging including two brake-cylinder-carrying type of brake beams one of which carries a brake cylinder device substantially at one side of the point midway its length, the piston rod of which cylinder device is operatively connected to one end of a force equalizing lever that is pivotally mounted midway its ends on a fulcrum member that is secured to the other brake-cylinder-carrying brake beam in place of a second brake cylinder device. Operatively connected to the other end of this lever is one end of a link that has its other end pivotally connected to the one brake beam at the other side of the point midway its ends at a location substantially the same distance from this midpoint as is the brake cylinder device carried by this one beam. This linkage is operable upon the supply of fluid pressure to the single brake cylinder device to effect movement of the brake beams in opposite directions to cause the application of the same brake applying force to brake shoes engaging the tread surface of each wheel of the car truck.

---

The present invention comprises a brake rigging for a two-axle four-wheel railway car truck wherein a single brake cylinder device secured to either one of two brake beams operatively moves both brake beams to apply the brakes through a force equalizing lever arrangement.

One of the present day brake riggings for four-wheel railway car trucks consists of two parallel brake beams each carrying a brake cylinder device with a piston that is operatively connected to the other brake beam by a piston rod so that the brake beams are moved in opposite directions respectively by the fluid pressure forces acting in opposite directions on the bodies of the brake cylinder devices and the respective pistons of these cylinder devices. Such a brake rigging is shown in Patent 2,958,398 issued Nov. 1, 1960, to George K. Newell and assigned to the assignee of the present application.

It is the general purpose of this invention to provide a novel brake rigging for railway car trucks, basically similar in operational principle to the above-mentioned present day type, but utilizing a simpler and relatively lower cost arrangement involving a single brake cylinder device which may be secured to either one of the two brake-cylinder-carrying brake beams and operatively connecting the two brake beams through simple force equalizing linkage which is actuable through fluid pressure forces exerted by the single brake cylinder device.

It is a further purpose of this invention to provide a car truck brake rigging arrangement whereby the type of brake rigging disclosed in the above-mentioned patent may be converted to a single brake cylinder device type of brake rigging by replacing one of the two brake cylinder devices by a fulcrum bracket member upon which a force equalizing lever of the present linkage may be pivotally mounted for operative connection with the other members of the linkage.

More particularly, according to the present invention, this novel brake rigging includes two brake-cylinder-carrying type of brake beams only one of which carries a brake cylinder device substantially at one side of the point midway its length, the piston rod of which cylinder device is operatively connected to one end of a force equalizing lever that is pivotally mounted midway its ends on a fulcrum member that is secured to the other brake-cylinder-carrying brake beam in place of a second brake cylinder device. Operatively connected to the other end of this lever is one end of a link that has its other end pivotally connected to the one brake beam at the other side of the point midway its ends at a location substantially the same distance from this midpoint as is the brake cylinder device carried by this one beam. Accordingly, this linkage is operable upon the supply of fluid pressure to the single brake cylinder device to effect movement of the brake beams in opposite directions to cause the application of the same brake applying force to brake shoes engaging the tread surface of each wheel of the car truck.

In the accompanying drawings:

FIG. 1 is a plan view, in outline, of a brake rigging for a two-axle four-wheel car truck, embodying the invention.

FIG. 2 is a partial end elevational view, on an enlarged scale, looking in the direction of the arrow, showing structural details, not apparent in FIG. 1, relative to the mounting of a force-equalizing lever.

Referring to FIG. 1 of the drawings, the reference numerals 1 and 2 designate respectively the wheels secured at opposite ends of each of two axles of a two-axle four-wheel railway car truck.

The brake rigging shown in the drawings comprises two identical cast brake-cylinder-carrying brake beams 3 and 4 which brake beams extend crosswise of the car truck and in parallel spaced relation to each other and to a truck bolster 5. The brake beams 3 and 4 are symmetrically arranged on opposite sides of the truck bolster 5 and are movably supported at each end on the side frame members 6 and 7 of the truck in the manner hereinafter described.

The brake beams 3 and 4 each have the shape of a standard channel, illustrated as a U-channel. Each of these brake beams is further constructed, as hereinafter described, to provide a support for either the brake cylinder device or a fulcrum bracket member hereinafter described.

A brake head 8 is riveted or otherwise attached to each end of the brake beams 3 and 4 adjacent to and on the inboard side of a guide foot 9. Each foot 9 is a flat L-shaped metal member, one leg of which extends between the flanges of the brake beam and is suitably secured thereto. The other leg of this guide foot 9 is slidably supported in a grooved wear plate and guide member 10, this wear plate and guide member being secured to the corresponding one of the truck side frame members 6 and 7. The wear plate and guide members and the guide feet serve to support the brake beams 3 and 4 at the proper height above the rails, (that is, somewhat below the horizontal diameter of the wheels) the groove in the wear plate and guide member 10 being at a slight angle to the horizontal to permit bodily movement of said brake beams in a direction radially of the associated wheels when a brake application is made.

Each brake head 8 carries a composition brake shoe 11 for contact with the tread surface of an associated wheel. In customary manner the shoe has a backing plate provided with a key bridge to receive a key 12 for removably locking the shoe to the brake head 8.

The brake shoes 11 are operated into and out of contact with their associated wheels 1, 2 by means of a fluid pressure motor or brake cylinder device 13.

In order to secure the brake cylinder device 13 or a lever fulcrum member 14 to one of the brake beams 3 and 4, the web of a cast U-beam or channel constituting each of these brake beams has formed integral therewith substantially at one side of the point midway its length a circular opening (not shown). The outer end of the respective upper and lower flanges of the brake beam adjacent this opening is provided with an inturned flange (not shown) which two inturned flanges from a circular opening substantially the same diameter as the outside diameter of a cup-shaped body of the brake cylinder device 13. This body is provided intermediate its ends with an out-turned flange 15 between which and the inturned flange formed by the portion of the web surrounding the circular opening therein is disposed a gasket 16 constructed of any suitable resilient material. The out-turned flange 15 and the gasket 16 are provided with a plurality of arcuately spaced smooth bores (not shown) through which extend a plurality of bolts 17 that also extend through corresponding smooth bores (not shown) provided in an upper flange 18 and a lower flange 18a (FIG. 2) that are cast integral with the respective brake beams. A nut 19 (FIG. 1) is secured to the of each bolt 17 and tightened against the corresponding one of the above-mentioned flanges to securely clamp the gasket 16 between these flanges on the brake beam 3 and the flange 15 on the body of brake cylinder device 13.

The inturned flange formed by the circular opening in the web of the brake beam 3 constitutes a non-pressure head for the brake cylinder device 13. This circular opening in the web of the brake beam 3 has a hollow rod 20 extending therethrough, the right-hand end of which is secured to or integral with a piston (not shown) that is slidably mounted in the cup-shaped body of the brake cylinder device 13. The hollow rod 20 is adapted to receive therein a push rod 21.

The push rod 21 extends through a window 22 (FIG. 2) formed in the bolster 5. As shown in FIG. 1 of the drawings, the push rod 21 occupies a substantially horizontal position and also extends through a window 23 (FIG. 2) formed in the brake beam 4. The left-hand end, as viewed in FIG. 1, of the rod 21 has formed thereon a clevis 24 the jaws of which are disposed on the opposite sides of one end of a lever 25 which is pivotally connected to the clevis 24 by any suitable means, such as, for example, the headed pin 26 and a cotter pin 27 (FIG. 2).

Substantially midway its ends the lever 25 has formed integral therewith and extending in opposite directions from the respective opposite sides thereof a pair of bosses 28 and 29 (FIG. 2) that are disposed between one end of a pair of spaced-apart parallel arms 30 and 31 that have their opposite ends formed integral with the lever fulcrum member 14. The lever 25 is rockably mounted on a headed pin 32 that extends through coaxial bores (not shown) provided in the arms 30 and 31, the bosses 28 and 29 and the lever 25, and carries at its lower end, as viewed in FIG. 2, a cotter pin 33.

As best shown in FIG. 2, the lever fulcrum member 14 has formed integral with the other end of the arms 30 and 31 an annular flange 34 which is provided with a rectangular opening or window 35 and a plurality of arcuately spaced smooth bores (not shown) that are coaxial with corresponding smooth bores (not shown) provided in the upper flance 18 and the lower flange 18a of the brake beam 4. Extending through each smooth bore in the flange 34 and the corresponding bore in the respective flange integral with the beam 4 is a bolt 36 the end of which receives a corresponding nut 37 which, when tightened against the respective flange integral with the beam 4, rigidly secures the lever fulcrum member 14 to this brake beam.

The other end of the above-mentioned lever 25 is disposed between the jaws of a clevis 38 formed on the left-hand end, as viewed in FIG. 1, of a link 39 and pivotally connected thereto by means such as, for example, a headed pin 40 and a cotter pin 41 (FIG. 2).

As shown in FIG. 1, the link 39 occupies a substantially horizontal position in spaced-apart parallel relation to the push rod 21 and extends through the window 35 (FIG. 2) in the flange 34 of the lever fulcrum member 14, a coaxial window 42 of the same size formed in the brake beam 4, and a window 43 (FIG. 2) of larger size formed in the bolster 5. The right-hand end of the link 39, as viewed in FIG. 1, is operatively connected to the brake beam 3 as by means such as, for example, a headed pin 44 and a cotter pin (not shown).

In operation, when it is desired to effect a brake application, fluid under pressure is admitted via a pipe connection 45 to a piston chamber (not shown) formed in the brake cylinder device 13 between the end of the brake cylinder body and the piston slidably mounted therein, by operation of the brake control valve device of the usual air brake system on railway cars under the control of the operator.

Fluid under pressure thus supplied to the above-mentioned chamber in the brake cylinder device 13 is effective to move the piston therein and the brake cylinder body in opposite directions. As this piston and body are moved in opposite directions, the body transmits a force to to the brake beam 3 which acts in the direction of the right-hand, as viewed in FIG. 1.

Simultaneously, the piston transmits a force to the lever 25 via the piston rod 21, clevis 24 and pin 26 which force is effective to rock the lever 25 clockwise, as viewed in FIG. 1, about the pin 32 carried by the arms 30 and 31 of the lever fulcrum member 14, it being noted that the lever 25 is mounted on the pin 32 midway the ends of this lever.

The clockwise rocking of the lever 25 about the pin 32 is effective to transmit a force to the link 39 via the pin 40 and the clevis 38. Since the lever 25 is mounted on the pin 32 midway the ends thereof, it is apparent that the force transmitted to the link 39 by the lever 25 is equal in magnitude to the force transmitted to the lever 25 by the piston rod 21. Furthermore, it is apparent from FIG. 1 of the drawings, that the force thus transmitted to the link 39 acts in a direction opposite the direction of the force transmitted to the piston rod 21 by the piston of the brake cylinder device 13. The force thus transmitted to the link 39 is in turn transmitted to the brake beam 3 via the pin 44.

As can be seen from FIG. 1, the location of the center line of the pin 44 is the same distance on one side of the point midway the ends of the brake beam 3 as is the location of the longitudinal center line of the brake cylinder device 13 on the other side of this point midway the end of the brake beam 3. Accordingly, it is apparent that the brake beam 3 is acted upon by two equal forces acting in the same direction on opposite sides of the point midway the ends of this beam 3 at equal distances from this point. Therefore, it wil be understood that these two equal forces acting on the brake beam 3 will move it in the direction of the right hand, as viewed in FIG. 1 of the drawings until the brake shoes 11 carried by this beam are brought into braking contact with the thread surfaces of the wheels 1 of the truck which prevents further movement of the brake beam 3 in the direction of the right hand.

Subsequent to movement of the brake shoes 11 carried by the brake beam 3 into braking contact with the tread surfaces of the wheels 1, the link 39 cannot move further in the direction of the right hand, as viewed in FIG. 1. Accordingly, it will be apparent that the pin 40 becomes a fixed fulcrum for the lever 25. Therefore, the force now transmitted to the lever 25 from the piston of the brake cylinder device 13, via the piston rod 21, clevis 24 and pin 26, becomes effective to rock this lever 25 clockwise, as viewed in FIG. 1, about the pin 40.

The length of the arms 30 and 31 of the lever fulcrum member 14 are so chosen that the center line of the pin 32 carried by these arms passes through the longitudinal center line of the truck which center line passes through the point midway the ends of the brake beam 4.

Since the lever 25 is pivotally mounted on the pin 32 midway the length of the lever 25, it is apparent that the force transmitted to the pin 32 by the lever 25 is twice the force transmitted to the pin 26 by the piston of the brake cylinder device 13 via the piston rod 21. Accordingly, it will be understood that the brake beam 4 now will be moved in the direction of the left hand as viewed in FIG. 1, by a force transmitted thereto by the pin 32 via the lever fulcrum member 14 having arms 30 and 31 in which the opposite ends of the pin 32 are anchored, and that the magnitude of this force is equal to the sum of the two above-described forces acting on the brake beam 3 to move it in the direction of the right hand, as viewed in FIG. 1. Therefore, the brake beam 4 will be moved in the direction of the left hand until the brake shoes 11 carried by this beam are brought into braking contact with the tread surface of the wheels 2 of the truck which prevents further movement of the brake beam 4 in the direction of the left hand.

As the brake beams 3 and 4 are moved, as described above, these beams are supported and guided by the guide feet 9 as each of these feet has sliding contact in a corresponding groove in the respective wear plate and guide member 10. As hereinbefore-mentioned, the orientation of the wear plates and guide members 10 is such that the brake beams 3 and 4 and the brake shoes 11 carried thereby are moved substantially radially toward the wheels.

It will be understood that, in view of the symmetrical disposition of the brake beams 3 and 4 on the opposite sides of the truck bolster 5, and since the area of the piston and the cup-shaped end of the body of the brake cylinder device 13 are the same, the fluid under pressure now being supplied to the chamber therebetween produces substantially equalized forces of application of all the brake shoes on the wheels of the car truck.

When it is desired to release the brake application, the fluid under pressure previously supplied to the chamber in the brake cylinder device 13 is vented in the usual manner through operation of the brake control valve device of the car brake system under the control of the operator, whereupon the force of a release spring (not shown) interposed between the piston and non-pressure head of the brake cylinder device 13, moves the piston and the body of this brake cylinder device in a brake releasing direction to move the brake beams toward each other and the brake shoes carried thereby away from the tread surface of the wheels to a normal clearance position with respect to the tread surface of the wheels to effect a brake release.

Due to the inclination of the grooves in the wear plate and guide members 10, the brake beams 3 and 4 tend to return by action of gravity to their normal symmetrical relation with respect to the truck bolster 5, in which position the clearance between the brake shoes on one brake beam and their associated wheels is substantially equal to the clearance between the brake shoes on the other brake beam and their associated wheels. However, due to the predominating weight of the brake beam 3 which carries the brake cylinder device 13 over the weight of the brake beam 4 which carries no brake cylinder device, the tendency is for the brake beam 3 to travel by action of gravity, upon the release of fluid under pressure from the chamber within the brake cylinder device 13, further down the inclined groove of the wear plate and guide members and thus past the normal intended release position. Therefore, in order to limit the travel of the heavier of the two brake beams towards its release position, each wear plate and guide member has the groove therein closed at its lower end. This closed end of the groove consequently serves as a limit stop to movement of the guide feet 9 of brake beam 3 toward the bolster 5.

It will be noted that it is not necessary to use a slack adjuster with this type of rigging. However, should it be desirable to use a slack adjuster, it will be understood that only one slack adjuster will be required for this type of rigging whereas the brake rigging shown in the hereinbefore-mentioned Newell Patent No. 2,958,398 would require two slack adjusters should it be desired to provide for take up of slack in that brake rigging.

Having now described the invention, what I claim as new and desire to secure by Letters Patent is:

1. A brake rigging for a four-wheel type of railway vehicle truck having a transverse axis and a longitudinal axis perpendicular thereto, which brake rigging comprises the combination of:
   (a) two identical brake beams extending in spaced substantially parallel relation to the transverse axis of the vehicle truck, and guidably supported at the ends thereof on the truck for bodily movement longitudinally of the truck, each of said brake beams having a mounting flange interposed between one end and the midpoint thereof for receiving either a brake cylinder casing or a fulcrum bracket member,
   (b) a brake cylinder casing secured to the mounting flange of one of said brake beams,
   (c) a fulcrum bracket member secured to the mounting flange of the other one of said brake beams,
   (d) a lever pivotally mounted midway its ends on said fulcrum bracket member,
   (e) a piston operable in said brake cylinder casing and cooperating therewith to form a pressure chamber to which fluid under pressure may be supplied to respectively exert forces acting in opposite direction on said piston and on said casing, said piston having a piston rod movable therewith substantially longitudinally of the truck and being operably connected to one end of said lever, and
   (f) a link pivotally connected at one end to the other end of said lever and at its other end to said one brake beam,
   (g) said link, lever and piston rod cooperating to transmit the fluid pressure force on said piston to said one brake beam whereby said force in cooperation with the fluid pressure force exerted on said casing effects movement of said one brake beam in one direction to a brake applying position with respect to a corresponding pair of wheels of the truck, and
   (h) said lever, fulcrum bracket member and piston rod cooperate, subsequent to movement of said one brake beam to said brake applying position, to transmit the fluid pressure force on said piston to said other brake beam to effect movement thereof in a direction opposite said one direction to a brake applying position with respect to the other pair of wheels of the truck.

2. A brake rigging for a four-wheel type of railway vehicle truck, as claimed in claim 1, further characterized in that said pivotal connection between said other end of said link and said one brake beam is the same distance from the longitudinal axis of the truck as the axis of said brake cylinder casing but on the opposite side thereof.

3. A brake rigging for a four-wheel type of railway vehicle truck, as claimed in claim 1, further characterized in that said piston rod and said link extend longitudinally in parallel spaced-apart relationship on opposite sides of the longitudinal axis of the car truck.

4. A brake rigging for a four-wheel type of railway vehicle truck having a longitudinal axis, a transverse axis perpendicular thereto, and a bolster the axis of which is coplanar with the transverse axis, the bolster being provided with a pair of spaced-apart windows extending therethrough in parallel relation to the longitudinal axis of the truck and symmetrically disposed on the opposite sides thereof, which brake rigging comprises the combination of:
   (a) two identical brake beams extending in spaced substantially parallel relation to the transverse axis of the truck and being disposed on the respective opposite sides of the bolster, each of said brake beams being guidably supported at the ends thereof on the truck for bodily movement longitudinally of the truck and having on the side thereof opposite the bolster a mounting flange interposed between one end and the midpoint thereof for receiving a brake cylinder casing or a fulcrum bracket member, each brake beam being also provided with two spaced-apart windows therein that are coaxial with the windows in the bolster while said beam is guidably supported on the truck, (b) a brake cylinder casing secured to the mounting flange of one of said brake beams, (c) a fulcrum bracket member secured to the mounting flange of the other one of said brake beams, (d) a level pivotally mounted midway its ends on said fulcrum bracket member, (e) a piston operable in said brake cylinder casing and cooperating therewith to form a pressure chamber to which fluid under pressure may be supplied to respectively exert forces acting in opposite directions on said piston and on said casing, said piston having a piston rod extending through one of the windows in the bolster and a coaxial window in each of said brake beams for simultaneous movement with said piston substantially longitudinally of the truck and being operably connected to one end of said lever, and (f) a link pivotally connected at one end to the other end of said lever and at its other end to said one brake beam, said link extending through the other of the windows in the bolster and the other window coaxial therewith in each of said brake beams in substantially parallel relation to said piston rod, (g) said link, lever and piston rod cooperating to transmit the fluid pressure force on said piston to said one brake beam whereby said force in cooperation with the fluid pressure force exerted on said casing effects movement of said one brake beam in one direction to a brake applying position with respect to a corresponding pair of wheels of the truck, and (h) said lever, fulcrum bracket member and piston rod cooperate, subsequent to movement of said one brake beam to its brake applying position to transmit the fluid pressure force on said piston to said other brake beam to effect movement thereof in a direction opposite said one direction to a brake applying position with respect to the other pair of wheels of the truck.

5. A brake rigging for a four-wheel type of railway vehicle truck, as claimed in claim 1, further characterized in that:

(a) said fulcrum bracket member comprises:
  (i) a flange matable with the mounting flange on either one of said brake beams by which said bracket member is secured to said other beam, and
  (ii) a clevis extending from said flange to a point coincident with the longitudinal axis of the vehicle truck, and (b) said lever is fulcrumed on said clevis, with the axis of the fulcrum intersecting the longitudinal axis of the truck.

References Cited

UNITED STATES PATENTS 3,298,474   1/1967   Roselius et al. _____ 188—52 X

DUANE A. REGER, *Primary Examiner.*